United States Patent [19]

Donovan

[11] 4,036,759

[45] *July 19, 1977

[54] APPARATUS AND SYSTEM FOR STABILIZING THE DISC ELEMENTS OF A ROTARY CONCENTRATOR FOR SOLIDS-CONTAINING FLUIDS

[75] Inventor: James Donovan, Cambridge, Mass.

[73] Assignee: Artisan Industries Inc., Waltham, Mass.

[*] Notice: The portion of the term of this patent subsequent to Nov. 2, 1993, has been disclaimed.

[21] Appl. No.: 724,176

[22] Filed: Sept. 17, 1976

Related U.S. Application Data

[63] Continuation of Ser. No. 596,639, July 17, 1975, Pat. No. 3,989,629.

[51] Int. Cl.² .............................................. B01D 25/38
[52] U.S. Cl. .................................. 210/298; 210/320; 210/323 R; 210/334; 210/336; 210/357; 210/413
[58] Field of Search .................. 210/298, 320, 323 R, 210/327, 330–334, 336, 339, 357, 413–415

[56] References Cited

U.S. PATENT DOCUMENTS 3,989,629 11/1976 Donovan .............................. 210/298

Primary Examiner—Thomas G. Wyse
Assistant Examiner—Richard W. Burks
Attorney, Agent, or Firm—Richard L. Cannaday; William J. Ungvarsky; Robert T. Tobin

[57] ABSTRACT

In a dynamic solids concentrator having a rotor with radially extensive disc-like elements which rotate adjacent other stationary or rotating disc-like elements, stabilizing members are provided along radial edges of the respective elements. In the case of the rotating elements, the stabilizing members are stabilizing fingers which ride within guide members on or guide paths in the inner walls of the concentrator and, in another embodiment, T-shaped stabilizing members whose arms ride on the surfaces of adjacent disc-like elements. In the case of the non-rotating elements, the stabilizng members are stabilizing fingers which ride within the guide members on or guide paths in the concentrators's rotor shaft. The fingers, T-shaped members and their cooperating guides stabilize the relative positions of the disc-like elements within the concentrator under conditions in which pressure differentials within the concentrator or high rotor speeds would otherwise disturb their relative positions.

3 Claims, 6 Drawing Figures

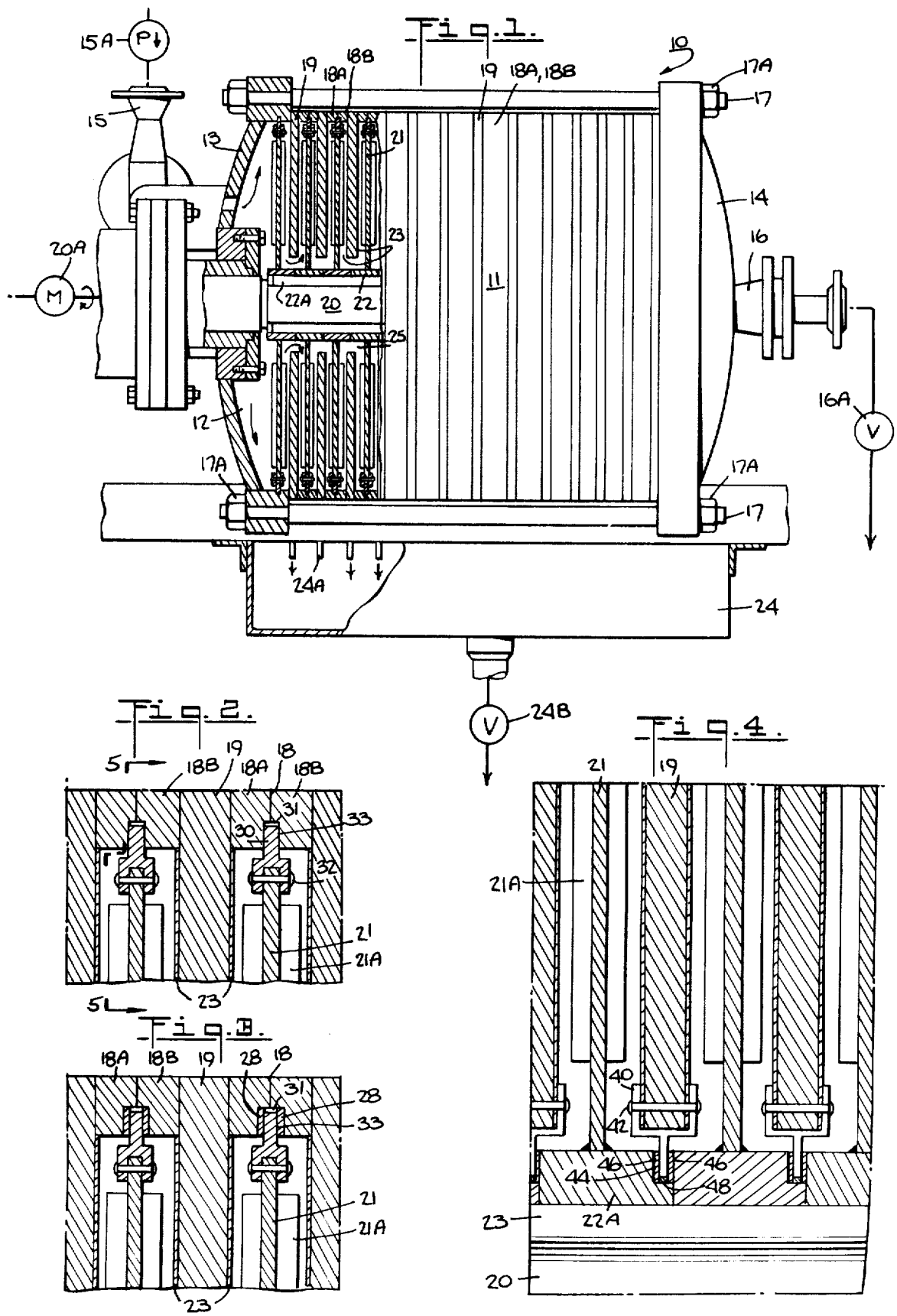

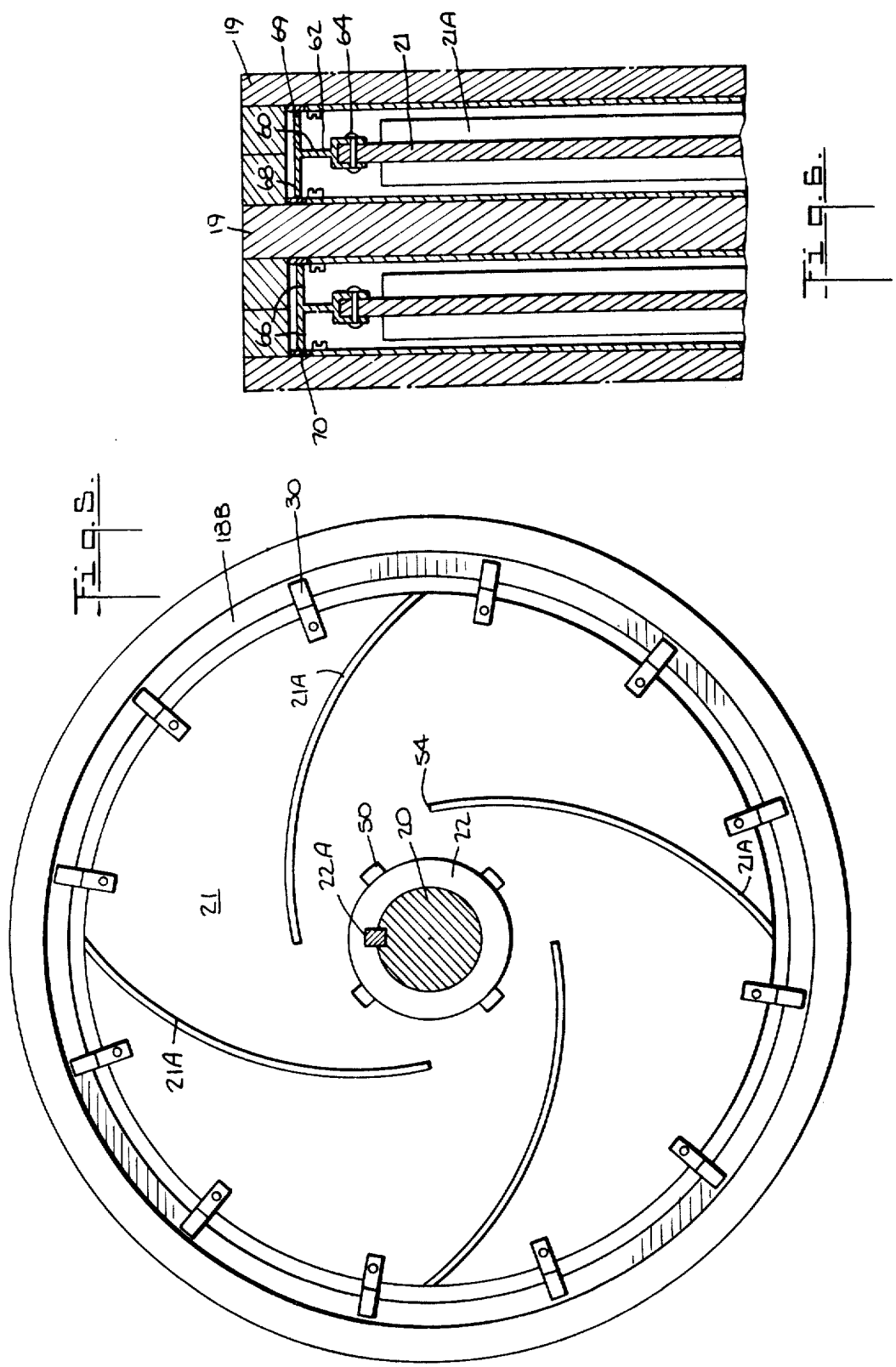

APPARATUS AND SYSTEM FOR STABILIZING THE DISC ELEMENTS OF A ROTARY CONCENTRATOR FOR SOLIDS-CONTAINING FLUIDS

This is a continuation, of application Ser. No. 596,639, filed July 17, 1975 and now U.S. Pat. No. 3,989,629.

BACKGROUND OF THE INVENTION

This invention relates to an apparatus for separating a vehicle fluid and a concentrate of solids from a solids-containing fluid. More particularly, this invention relates to a means for stabilizing the relative positioning within a dynamic concentrator of rotating elements adjacent thereto.

Heretofore, it has been known that dynamic filters or concentrators may be employed to separate a vehicle fluid and a concentrate of solids from a solids-containing fluid. For example, U.S. Pat. No. 3,437,208 describes an apparatus for the dynamic filtration of liquids wherein rotating filtering elements of disc-like configuration are alternatively disposed with either stationary filtering elements or stationary solid bodies. U.S. Pat. No. 3,437,208 also describes a filtration apparatus in which rotating disc-like elements of solid construction are alternatively disposed with stationary filter elements. Further, U.S. Pat. No. 1,264,635 discloses a filtering apparatus having rotating disc-like filter elements which are alternatively disposed with adjacent counter-rotating filter elements.

If it be desired to increase the filtering effect of a dynamic filtration apparatus as that described in U.S. Pat. No. 3,437,208, one means might be to increase the diameter of the filtering elements, and another might be to increase the number of coaxial filtering elements disposed serially along the longitudinal axis of the apparatus. However, the apparatus described in the patent has a cantilevered rotor shaft, and increasing the length of the rotor shaft may result in undesirable wavering from a normal path of those rotating members which are mounted to the cantilevered shaft relatively close to its unsupported end. Also, increasing the diameter of the filtering and cooperating elements within the apparatus may result during operation of the apparatus in undesirable deflection of the peripheries of those elements absent a radical stiffening of them. Such stiffening would increase the cost and the bulk of the apparatus.

Further, in a dynamic concentrator or filter having rotating disc-like elements, increases in the angular speed of the rotating elements may cause their peripheries to vibrate or otherwise vary in position for kinetic reasons. Also, in a dynamic concentrator wherein the solids-containing material being processed is pressurized, pressure differences across elements in the concentrator may bend or otherwise displace the elements during operation of the apparatus.

Any change in the relative positioning of the elements within a concentrator having rotating elements may cause binding of adjacent elements within the concentrator, bringing about a standdown of, or damage to, the apparatus. Accordingly, dynamic concentrators have had limitations with respect to the maximum fluid pressure employable within the apparatus, the maximum rotational speed of their rotating elements, and the diameter of their filtering members or elements. As indicated, there have also been limitations as to the number of coaxial filtering stages employable in a concentrator having a rotor shaft of cantilevered mounting.

OBJECTS OF THE INVENTION

Accordingly, it is an object of this invention to provide a means for stabilizing the positions of rotating elements relative to other elements within a dynamic concentrator.

It is a further object of this invention to provide means for protecting a dynamic concentrator against damage caused by displacement in position of either shaft-mounted rotating elements or of their adjacent elements whether stationary or rotating during operation of the concentrator.

It is a further object of this invention to prevent the relative displacement of rotating elements and adjacent stationary or rotating elements subjected to pressure differentials within a dynamic concentrator.

It is a further object of this invention to provide means for stabilizing disc-like rotating members in a dynamic concentrator which is of large size or is subjected to high rotational speeds.

SUMMARY OF THE INVENTION

Briefly, this invention is concerned with stabilizing the relative positions of elements within a dynamic concentrator for solids-containing fluids having a rotor with a plurality of disc-like elements which rotate adjacent other stationary or rotating surfaces. Such a dynamic concentrator may have stationary, circular or annular filter elements of hollow construction arranged between radially extensive discs of solid construction mounted on a rotor shaft. With the shaft-mounted disc elements rotating in such a concentrator, a solids-containing fluid which is under pressure is forced to pass in sinuous, U-turn fashion across and around the peripheries or free edges of the discs and across the faces of filter diaphragms on adjacent filter elements. During operation of the concentrator pressure differentials occur between the inlet and discharge spigots thereof, across the filter diaphragms through which separated vehicle fluid or filtrate is extracted and, most pertinently, from side to side of the rotor discs and from side to side of the filter elements which carry the filter diaphragms. The forces created by th pressure differentials tend to distort or displace the radial peripheries of the rotating discs and the filter elements. If not corrected, such distortion or displacement may cause problems during operation of the concentrator; for example, the rotating discs may be sufficiently displaced that they hit against the surfaces of adjacent filter elements.

To stabilize the relative positions of the rotating discs according to this invention those discs are provided with angularly spaced-apart fingers or projections on their outer edges which ride along guide members on, or guide paths in, the inner wall of the concentrator housing. An alternative embodiment of this invention employs angularly spaced-apart T-shaped appendages on the outer edges of the rotating discs whose arms or fingers ride along a guide path on the surfaces of adjacent filter elements instead of on or in the inner wall of the concentrator housing. To stabilize the positions of the stationary, angular filter elements, their inner edges which face the rotor shaft are provided with angularly spaced-apart finges or projections which ride along guide members on or guide paths in that shaft.

The stabilizing fingers or projections can either themselves be hardened for wear resistance, or they can have replaceable inserts in their respective distal ends, which inserts are hardened and adapted to be removed and replaced after they have worn down. Similarly, the guide members can themselves be hardened for wear resistance, or they can be provided with replaceable, wear-resistant inserts which provide riding surfaces for the fingers. As an alternative or in addition, roller or ball bearings may be employed in the distal ends of the fingers.

BRIEF DESCRIPTION OF THE DRAWINGS

The nature and substance of the present invention as well as its objects and advantages will be more clearly perceived and fully understood from consideration of the following detailed description and the appended claims taken in conjunction with the accompanying drawings in which:

FIG. 1 is a partial view in longitudinal cross-section of a concentrator having stationary filter elements of hollow construction and interposed rotor discs with stabilizing means mounted on the radial peripheries thereof according to this invention;

FIG. 2 is an enlarged cross-section view of representative stabilizing means in FIG. 1;

FIG. 3 is a cross-sectional view of a second embodiment of a stabilizing means according to this invention for the rotor discs of the concentrator shown in FIG. 1;

FIG. 4 is a partial cross-sectional view of the concentrator shown in FIG. 1 which has been modified according to this invention to include stabilizing means on the stationary filter elements extending into guides in the rotor;

FIG. 5 is an end elevation or face view along the line 5—5 of FIG. 2 looking in the direction of the arrows, of a rotor disc with stabilizing means according to this invention; and FIG. 6 is a cross-sectional view of a third embodiment of a stabilizing means according to this invention for the rotor discs of the concentrator shown in FIG. 1.

DESCRIPTION OF THE PREFERRED EMBODIMENTS

FIG. 1 illustrates a rotary concentrator 10 having a housing 11 which defines a separation chamber 12 and includes a pair of end plates 13, 14 at its opposite ends. The front end plate 13 is provided with inlet spigot 15 which is coupled to a pump or fluid supply means 15A for the introduction into the concentrator of a solid-containing fluid, while the rear end plate 14 is provided with an outlet spigot 16 for the removal from the concentrator of a concentrate of solids which may be in the form of a slurry. In addition, the outlet spigot 16 has a control valve 16A to control the outflow of the concentrated slurry through the spigot 16. Housing 11 is of built-up or stacked construction and is held together by a plurality of tie rods 17 each with a nut 17A on each end. These rods and nuts press together end plates 13, 14, between which and pressed together by which there are a plurality of ring-like elements 18A and 18B. As shown in FIGS. 2 and 3, the ring-like elements 18A and 18B are secured as by welding in sets to the separate annular filter elements 19 on opposite sides of each prior to final assembly of the concentrator with the tie rods 17. After assembly any two immediately adjacent ring-like elements 18A and 18B abut each other along an annular plane 18 shown in FIGS. 2 and 3, and the ring-like elements 18A, 18B constitute other rims or flanges for their respective filter elements 19.

A rotor shaft 20 operatively coupled to a motor 20A extends through the front end plate 13 of the housing of the concentrator 10 and terminates within the separation chamber 12. This shaft 20 extends essentially concentrically or coaxially through central openings 25 in the filter elements 19 and carries a plurality of radially extensive rotor discs 21 which turn within separation chamber 12 with the rotor shaft. The rotor discs 21 are each of solid configuration with vanes 21A on opposite, planar surfaces. Each disc is secured as by welding to a collar or hub 22, and the hubs 22 are in turn secured by a key 22A to the rotor shaft 20. A nut, not shown, threaded onto the free or cantilevered end of the rotor shaft 20 maintains the longitudinal or axial positioning of the disc hubs 22. Each rotating element 21 has an outer, generally cylindrical periphery of a diameter less than the inside diameter of the flange portions 18A and 18B of the annular filter elements 19, and the edges of the vanes 21A on the side surfaces of the rotor discs 21 are spaced from any end wall 13, 14 or filter element 19 which is adjacent the respective rotor disc. The hubs 22 of the rotor discs 21 are in abutting relationship and serve to space the discs 21 in alternating relationship with the filter elements 19 along the longitudinal axis of the rotor shaft 20.

Each filter element 19 is of annular configuration with a central opening 25 for the passage of the rotor shaft 20. In addition, each filter element 19 is provided with a pair of opposite filtering surfaces 23 formed for example by filter cloth, and is of hollow construction to provide for passage of filtrate through the filtering surfaces 23 and thence to a filtrate drain pan 24 from drains 24A for the respective filter elements 19. A valve 24B is provided to control the discharge of filtrate from the drain pan 24. The filtering diaphragms or surfaces 23 of the filter elements are secured in place in a known manner as by means of bolts (not shown) which thread into the filter elements along the edges of the filtering diaphragms.

Each rotor disc 21 is provided with a plurality of spaced-apart stabilizing members 30, for example four or twelve, which are mounted equidistantly as shown in FIG. 5, about the outer circumference of the disc. In the embodiment of FIGS. 1 and 2, each stabilizing member 30 has a U-shaped portion through which it is secured to its respective disc 21 and a projection or finger portion which extends radially outwardly from the disc and toward the interior wall of the concentrator's housing 11. The U-shaped portion of each stabilizing member is mounted to the disc by at least one bolt 32, and the finger portion extends into a recess 33 of circumferential extent in the inside surface of the housing 11, that is, in the inside surface of each flange portion or spacer ring 18A,B. A clearance of, for example, 0.005 to 0.010 inch (0.13 to 0.25mm.) is provided between the sides of the finger and the walls of the recess. The fingers ride within the guide path provided by recess 33 as the rotor shaft and discs are turned.

During operation, as the rotor discs 21 are rotated there is a flow of solids-containing fluid entering the concentrator through inlet spigot 15, and continuing in a sinuous pattern from one side of each rotor disc to the other and across the filtering surfaces 23 of the filter elements 19 as indicated in FIG. 1. The fluid makes a tight U-turn about the outer periphery of each rotor disc 21 and about the inner peripheries of the filter elements. During such operation, as the finger portions of the stabilizing members 30 ride within recesses or channels 33 on the interior of the housing they cannot have any significant axial movement and so operate to prevent displacements or deflections of the rotor discs such as might tend to result from the presence of pressure differentials across the discs caused by the supply pressure of pump 15A on solids-containing fluid passing through the concentrator, or such as might result dynamically from rotation of the filter discs through the solids-containing fluid.

FIG. 3 illustrates an alternative embodiment of a stabilizing means according to this invention for the rotor discs of the concentrator shown in FIG. 1 and FIG. 2 wherein like numbers denote like members of the apparatus. In the embodiment of FIG. 3 a pair of flat bearing washers 28 are secured as by cement in confronting relationship within the guide channels or recesses 33 and a ring-like bearing strip or wear strip 31 is secured as by cement to the bottom of the recess. An advantage of this embodiment is that the washers 28 and the bearing strip 31 are inserts which may be removed and replaced upon any wear.

FIG. 4 illustrates a modification of the concentrator shown in FIG. 1 according to this invention by the inclusion of stabilizing means for the stationary filter elements 19 of the concentrator. In FIG. 4 corresponding members of the concentrator shown in FIG. 1 are denoted by like numbers. As shown in FIG. 4, in this embodiment of the filter elements 19 have stabilizing means 40 mounted on their inner periphery. The stabilizing means have U-shaped portions which are secured by bolts 42 to the filter elements and projections or finger portions which extend inwardly therefrom. The distal ends of the fingers are received in circular guide or receiving recesses 44 whose planes are normal to the longitudinal axis of the rotor shaft. The generative center point of the circular recesses 44 is on the longitudinal axis of the rotor shaft. A pair of flat bearing washers 46 are secured as by cement within each recess on either side of the finger received therein. Further a bearing strip 48 is secured as by cement to the distal face of each finger. The guide recesses 44 are formed in the hubs 22 for the rotor discs 21 which are alternatively disposed with the filter elements. During operation, the finger portions of the stabilizing means 40 ride within the circular recesses or guide channels 44 as the rotor shaft turns relative to the filter element, and the fingers and guide channels cooperate to prevent displacements of the filter elements such as might tend to result from pressure differentials across the filter elements 19. As with the stabilizing members 30 for the rotor elements illustrated in FIGS. 1-3, the stabilizing means 40 for the filter elements illustrated in FIG. 4 may comprise a plurality of stabilizing means 40, such as four, mounted equidistantly about the inner edge of each filter element 19. By such spacing apart of the stabilizing members 30 and the stabilizing means 40, displacements of the edges of the respective rotor and filter elements are controlled, and yet adequate passageways remain for the flow of solids-containing fluid past their edges since it is only the fingers which extend into the flow path.

In the embodiment shown in FIG. 2 a plurality of spaced-apart stabilizing members 30 may be mounted along the periphery of the rotor discs 21. As shown in FIG. 5, 12 stabilizing members 30 are mounted equidistantly around the periphery of rotor discs 21 and mounted to ride between the ring-like elements 18A and 18B. Alternatively, the stabilizing members 30 may be mounted to rotate within the guide channels or recesses 33 against a ring-like bearing strip or wear strip 31.

The rotor disc 21 shown in FIG. 5 is secured as by welding to a collar or hub 22 which is secured to the rotor shaft 20 by a key 22A. A plurality of equally spaced fluid passages 50 are arranged along the interior periphery of the rotor disc 21 adjacent the collar 22. The passages 50 serve to permit a portion of the solids-containing fluid within the separation chamber 12 to flow through rather than around the rotor discs 21. Alternatively the passages can be omitted or, in a further modification, passages may be provided elsewhere in the rotor discs 21 for a flow of fluid through the rotor discs.

As also shown in FIG. 5, each radial rotor disc 21 has four or more equally spaced blades or vanes 21A on each of its radial surfaces which project from the respective radial surface of the discs 21 towards an adjacent filter element 19, when the disc element is in place in the housing 11. The blades each extend in a curved path from a point 54 adjacent to but spaced apart from its collar 22 to the outer periphery of the disc. On the internal discs 21 the curvilinear configuration of the blades 21A on one radial surface of any disc is in the mirror image of the configuration of the blades on the opposite surface of that disc. Thus, each disc 21 is mounted on the rotor shaft 20 such that the intended direction of rotation of movement imparted to solids-containing fluid contacted by its blades 21A on either side of the rotor element, corresponds to the direction of movement of the flow path on said side of the rotor element as indicated generally by arrows in FIG. 1. Thus, for given direction of rotation the blades on one side direct fluid circumferentially and radially outwardly of the rotor disc 21 and the blades on the opposite side direct fluid radially inwardly. The rotor disc 21 is mounted in the apparatus such that these directions correspond to the intended flow path adjacent the respective blades.

FIG. 6 shows a further embodiment of the stabilizing means wherein the stabilizing means 60 are T-shaped members having a lower portion 62 which extends radially outward from disc 21. The portion 62 is fastened to disc 21 by rivets 64 or other appropriate fastening means. The stabilizing means 60 includes a pair of arms 66 which are substantially perpendicular to the lower portion 62 of the T-shaped members, and which extend toward each of the adjacent filters 19. The arms 66 may be constructed to provide a small clearance between the distal ends 68 and 69 of the arms and the surfaces of the adjacent filters 19. A removable bearing surface 70 may then be secured as by cement upon the surfaces of the filters 19 adjacent to the distal ends 68 and 69 of the T-shaped member 60. Thus, should these surfaces 70 become worn during operation of the stabilizing means 60 the surfaces 70 may be replaced.

During the operation of the unit, the stabilizing means 60 shown in FIG. 6 rotate with the rotor discs 21 and cooperate with the filter elements 19 to prevent displacements of the rotor discs 21 such as might tend to result from pressure differentials across the filter elements 19. Similar to the embodiment shown in FIG. 5, a plurality of T-shaped stabilizing elements 60 may be mounted equidistantly on the periphery of the rotor discs 21. In this manner stabilization of the rotor discs 21 is provided at spaced-apart locations around the periphery of the discs 21.

CONCLUSION

As appears from the foregoing, by this invention a guide and support system is provided which tends to stabilize the relative positioning of the rotating and non-rotating elements of a dynamic concentrator. In one capability or operational attribute; fingers are provided at the outer edge of rotating elements and their distal ends ride in guideways formed in or secured to an inner stationary wall of the housing. In another capability, fingers are provided on non-rotating elements and their distal ends ride in guideways secured to or formed in the rotor shaft of the concentrator or hubs or discs thereon.

While in the herein particularly described embodiments of this invention the filter elements 19 and the housing 11 for the concentrator are described as being stationary, it is within the contemplation of this invention that all filter elements, the housing or both all filter elements and the housing can rotate or be otherwise non-stationary, so long as the concentrator includes a rotor element which rotates relative to the concentrator's housing and relative to the filtering surfaces or diaphragms of the filter elements. More generally, it is contemplated that there be at least two spaced-apart surfaces which are relatively stationary surfaces. In this regard it is further contemplated that the housing of the concentrator and the relatively stationary surfaces may rotate either in the same or in the counter direction as the direction of rotation of the rotor element.

Also, while the herein particularly described embodiments of this invention include relatively stationary filter elements 19 which cooperate with rotor discs 21 of solid construction, it is contemplated that relatively stationary discs of solid construction can be employed in association with filter members carried by a rotor shaft. Further, it is contemplated that a concentrator according to this invention can comprise an alternating or serial arrangement of rotor elements which are sometimes of hollow construction to serve as filter elements and sometimes of solid construction, together with an alternating or serial arrangement of relatively stationary members which are sometimes of hollow construction to serve as filter elements and sometimes of solid construction.

Protection by Letters Patent of this invention in all its aspects as the same are set forth in the appended claims is sought to the broadest extent that the prior art allows.

I claim as my invention:

1. In an apparatus for continuous separation of a solids-containing fluid into a vehicle fluid and a concentrated slurry of solids which includes (1) a housing characterized by an interior surface and a longitudinal axis and having an inlet for introducing a solids-containing fluid into said housing and an outlet for removing a concentrated slurry of solids therefrom; (2) at least two substantially parallel, coaxially disposed, spaced-apart annular elements mounted within said housing on the longitudinal axis thereof and established stationarily with respect thereto between said inlet and said outlet; (3) a rotor shaft extending within said housing along the longitudinal axis thereof and passing coaxially through said annular elements in spaced diametral relation thereto leaving openings for fluid flow between the outer surface of said shaft and the inner circumferential surfaces of said annular elements, said shaft being rotatable with respect to said housing and said annular elements, and (4) a radially extensive rotor element having one side and another, opposite side and an outside edge mounted to said rotor shaft to turn therewith with its outside edge terminating in spaced relation to the interior surface of said housing and positioned between said spaced-apart annular elements to define a flow path for solids-containing fluid from said inlet to said outlet extending across at least one side of one of said spaced-apart annular elements between it and one side of said rotor elements, then between the outside edge of said rotor element and the interior surface of said housing and then between the other, opposite side of said rotor element and the other of said annular elements with at least one of those elements being a filter means comprising a filter chamber having at least one filtering surface serving as a boundary of said flow path with the interior of that chamber being in fluid flow communication with the exterior of said housing for the removal of filtrate vehicle fluid from that chamber, the improvement comprising at least one stabilizing member secured to the inner circumferential surface of at least one of said annular elements and having a portion extending radially from said one element toward said rotor shaft, and means on the rotor shaft for receiving said portion of the stabilizing member in a circular recess the generative center of which is on the longitudinal axis of the rotor shaft.

2. The improvement of claim 1 wherein there are a plurality of said stabilizing members secured in spaced-apart relationship to the inner circumferential surface of said one annular element.

3. The improvement of claim 2 wherein the stabilizing members each comprise a U-shaped portion secured to said one annular element and a finger portion extending therefrom the distal end of which is within the circular recess of said receiving means on the rotor shaft.

* * * * *